US011808299B2

(12) United States Patent
Heward et al.

(10) Patent No.: US 11,808,299 B2
(45) Date of Patent: Nov. 7, 2023

(54) COMPLIANT FOIL RADIAL BEARING

(71) Applicant: BLADON JETS HOLDINGS LIMITED, Castletown (IM)

(72) Inventors: Phillip Heward, Warwick (GB); Vasudeva Nimma, Warwick (GB); Stephen Pye, Warwick (GB)

(73) Assignee: BLADON JETS HOLDINGS LIMITED, Castletown (IM)

( * ) Notice: Subject to any disclaimer, the term of this patent is extended or adjusted under 35 U.S.C. 154(b) by 107 days.

(21) Appl. No.: 17/440,572

(22) PCT Filed: Mar. 22, 2019

(86) PCT No.: PCT/EP2019/057348
§ 371 (c)(1),
(2) Date: Sep. 17, 2021

(87) PCT Pub. No.: WO2020/192880
PCT Pub. Date: Oct. 1, 2020

(65) Prior Publication Data
US 2022/0145929 A1    May 12, 2022

(51) Int. Cl.
*F16C 17/02* (2006.01)
*F16C 27/02* (2006.01)
*F16C 43/02* (2006.01)

(52) U.S. Cl.
CPC ............ *F16C 17/024* (2013.01); *F16C 27/02* (2013.01); *F16C 43/02* (2013.01); *F16C 2226/62* (2013.01); *F16C 2360/23* (2013.01)

(58) Field of Classification Search
CPC .................................................. F16C 17/024
See application file for complete search history.

(56) References Cited

U.S. PATENT DOCUMENTS

| 4,475,824 | A | 10/1984 | Glaser et al. |
| 5,427,455 | A | 6/1995 | Bosley |
| 6,698,930 | B2 * | 3/2004 | Akizuki ................. F16C 27/02 384/106 |
| 7,614,792 | B2 | 11/2009 | Wade et al. |
| 8,371,799 | B2 | 2/2013 | Spathias et al. |
| 9,360,042 | B2 | 6/2016 | Thompson et al. |
| 2002/0106138 | A1 | 8/2002 | Akizuki et al. |
| 2017/0167533 | A1 | 6/2017 | McAuliffe et al. |

FOREIGN PATENT DOCUMENTS

| CN | 101709747 A | | 5/2010 |
| DE | 3531720 | * | 3/1987 |
| EP | 0021711 A1 | | 1/1981 |
| JP | S58160619 A | | 9/1983 |
| JP | 2006177542 A | | 7/2006 |
| WO | 9211469 A1 | | 7/1992 |

* cited by examiner

*Primary Examiner* — James Pilkington
(74) *Attorney, Agent, or Firm* — Rahman LLC (57) ABSTRACT

A compliant foil radial bearing (100) comprising: a bushing (110) comprising a bore defined therethrough; a spring foil (120, 130) arranged to conform to a radially inner surface of the bushing; a fluid foil (140, 150) arranged to conform to a radially inner surface of the spring foil for rotatably receiving a rotor, wherein: the radially inner surface of the bore comprises a plurality of axially oriented pads arranged around the circumference thereof.

20 Claims, 7 Drawing Sheets

Fig. 9

COMPLIANT FOIL RADIAL BEARING

CROSS-REFERENCE TO RELATED APPLICATIONS

This application is a U.S. National Stage entry of International Application No. PCT/EP2019/057348 filed Mar. 22, 2019, which is herein incorporated by reference in its entirety for all purposes.

TECHNICAL FIELD

The subject matter disclosed herein relates generally to compliant foil radial bearings.

BACKGROUND

Micro turbines may be utilized in distributed energy resources and may employ a compressor, combustor, turbine and electric generator thereby to convert fuel into a local source of electric power. Their small footprint, high rotational speeds and high operating temperatures render traditional bearings, such as oil-based hydrostatic bearings, impractical.

Compliant fluid foil radial bearings utilize: a bushing; a compliant spring foil that conforms to the inner surface of the bushing; and a fluid top foil that conforms to the inner surface of the compliant spring foil, the inner surface of the fluid top foil for receiving a rotor.

Prior to spin-up, gravitational forces acting on the rotor compress the fluid foil and spring foil between the rotor and inner surface of the bushing. Following spin-up, the creation of a thin layer of fluid between the non-rotating fluid foil and the rotating rotor results in the rotor, as it were, lifting off from the fluid foil, giving rise to a low friction hydrodynamic bearing, and, additionally, the transfer of fluid facilitates heat transfer.

Compliant fluid foil radial bearings may therefore be employed in micro turbines to combat the impracticalities associated with other traditional forms of radial bearing given the high rotational speeds and operating temperatures.

Existing fluid foil bearing designs generally employ a corrugated spring foil and fastening mechanism between the spring foil and bushing resulting in excessive manufacturing complexity. Furthermore, the effectiveness at low revolutions per minute of such existing designs is sufficiently poor that excessive bearing wear is introduced during spin-up and even during post spin-up normal operation. The performance of such existing designs is overly dependent upon the manufacturing specifics associated with the spring foil. Finally, the scope for optimization of the friction characteristics of these existing designs is limited.

It is therefore desirable to provide a fluid foil bearing resolving one or more of the above-described deficiencies in existing designs.

BRIEF DESCRIPTION OF THE DRAWINGS

Disclosed arrangements are further described hereinafter by way of example and with reference to the accompanying drawings, in which.

DETAILED DESCRIPTION

Figure 1:
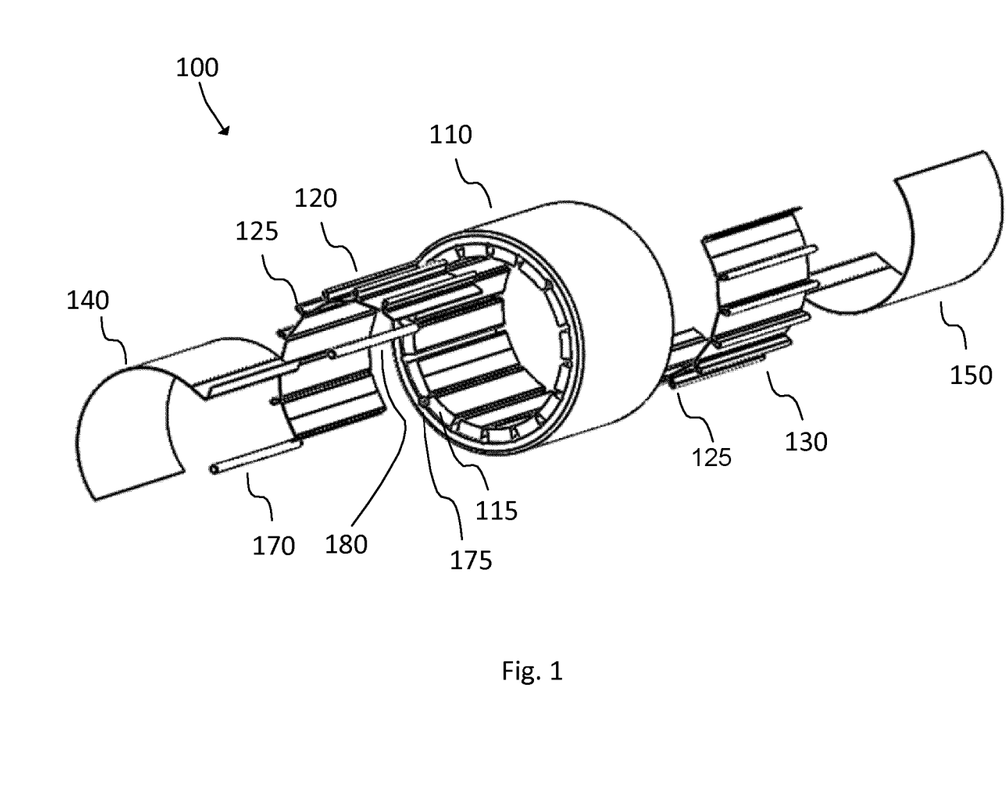
FIG. 1 depicts an example of a compliant foil radial bearing in an exploded perspective view.

FIG. 1 depicts an example of a compliant foil radial bearing 100 comprising a bushing 110 comprising a bore defined therethrough, a spring foil 120, 130 arranged to conform to a radially inner surface of the bushing, a fluid foil 140, 150 arranged to conform to a radially inner surface of the spring foil for rotatably receiving a rotor, wherein the surface of the bore comprises a plurality of axially oriented pads 115, or ridges, arranged around the circumference thereof.

The pads 115 may define axially oriented ridges extending in a radially inward direction. The radially inner surface of the bushing may define an alternating series of axially oriented grooves and ridges arranged around the circumference thereof.

The pads may be formed by forming axially oriented grooves formed in the radially inner surface of the bore. Thus, the pads may be unitary with the bushing. Alternatively, the pads may be separately formed from the bushing.

In the example of FIG. 1, the spring foil comprises first 120 and second 130 spring foil segments. Likewise, the fluid foil comprises first 140 and second 150 fluid foil segments. This arrangement is commensurate with a two-lobe radial bearing, however the disclosure herein is equally applicable to a one, three or other lobe bearing in which the spring foil and fluid foil comprise one, three or another number of segments.

Figure 2:
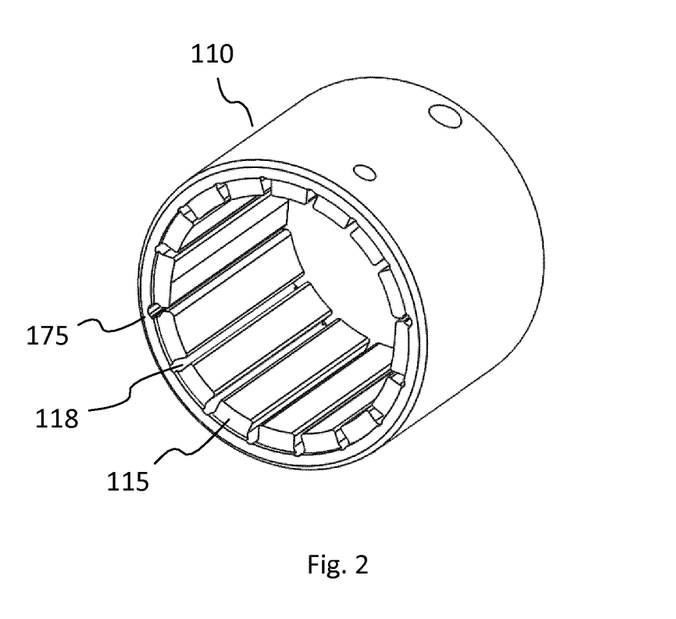
FIG. 2 depicts an example of a bushing comprising axially oriented pads.

FIG. 2 depicts bushing 110 and axially oriented pads 115 extending in a direction parallel with the axis of the bushing. The pads 115 may be co-axial with the bushing.

The pads 115 may be integrally formed with the bushing 110, offering simplified manufacturing. For example, the pads may be formed by forming axially oriented grooves 118 in the inner surface of the bushing. The cross-sectional profile of the axially oriented grooves 118 may substantially define at least a portion of a rectangular profile, a trapezoidal profile or a circular profile.

Alternatively, the pads 115 may be separately formed from the bushing 110. The pads may be secured to the bushing. The pads and bushing may be arranged to fit together. For example, the pads may be provided with retaining plugs to fit within retaining sockets provided in the bushing or vice versa. By forming the pads separately from the bushing, there is facilitated the possibility that the pads are interchangeable for repair purposes or for different applications, load conditions, etc.

The pads 115 may be evenly distributed around the circumference of the bore. Alternatively, the pads 115 may be unevenly distributed around the circumference of the bore.

Figure 3:
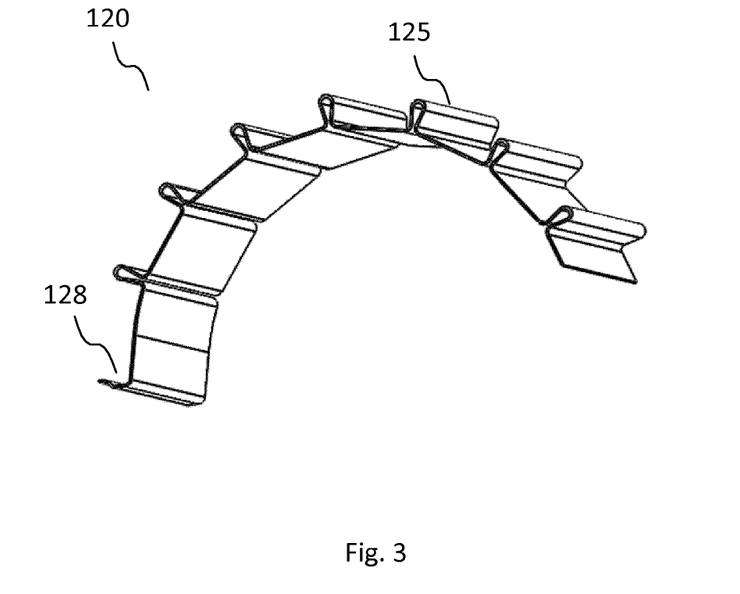
FIG. 3 depicts an example of a spring foil comprising axially oriented loops.

FIG. 3 depicts a spring foil 120. The spring foil 120 may be formed from sheet metal.

The spring foil 120 may be arranged to extend within the grooves between adjacent pads and provide one or more axially oriented strips, or contact regions, for resiliently contacting the fluid foil 140.

The spring foil 120 may comprise one or more axially oriented strips, or contact regions, for contacting the fluid foil 140. Each strip for contacting the fluid foil 140 may be supported at one or both sides by axially oriented portions of the spring foil that extend within, and may be secured with respect to, the grooves between the pads 115. In this way the contact regions may offer a resilient support for the fluid foil in the form of cantilevers or beams between the axially oriented support regions. For example, there may be provided a plurality of axially oriented strips for contacting the fluid foil 140 around the circumference of the bushing. Whilst FIG. 3 shows a plurality of axially oriented strips and axially oriented support regions extending within the grooves that are connected, the strips and one or both axially oriented support regions may be separated from each other.

Thus, the spring foil 120 may comprise a plurality of axially oriented strips for contacting the fluid foil, with each strip supported at one or both circumferential ends thereof by axially oriented support sections that radially extend within, and may be secured with respect to, the grooves between pads 115.

Each pad may comprise a radially inner surface arranged to contact the spring foil at circumferentially spaced axially oriented contact regions. For example, the radially inner surface of each pad may be arranged such that the contact between the pad and the spring foil defines a gap therebetween. Such a gap offers a space for resilient deformation of the spring foil against the pad.

Each pad may comprise a radially inner surface comprising a circumferential concavity. In this way the spring foil may contact each pad such that there exists a gap between the radially inner surface of each pad and the spring foil. The gap may be situated between axially oriented contact regions between each pad and the spring foil.

As shown in FIG. 3, there may be formed kinks or loops 125 in the spring foil. The loops 125 may be formed by bending the sheet metal thereby to form kinks or loops in cross section. The loops 125 may extend in a parallel direction from one end of the sheet metal to another. This parallel direction may be axial when the spring foil is inserted in the bushing. The spacing between the loops 125 may correspond with the circumferential spacing between grooves formed within the bushing 110 between pads 115. In this way, the loops 125 may be inserted within the grooves 118.

It is pertinent to consider that the spring foil 120 depicted in FIG. 3 is significantly less onerous to manufacture as compared with the case of corrugated spring foil implementations requiring complicated manufacturing processes.

The spring foil 120 may be provided at one or both ends with retaining portions 128 arranged to wrap around retaining members 170, 180. An example of this is apparent from consideration of FIG. 5. The spring foil 120 may be considered to comprise two circumferential end regions between the end loops and the circumferential extremities, with one circumferential end region comprising a circumferential length greater than the other to provide a retaining portion 128.

Figure 5:
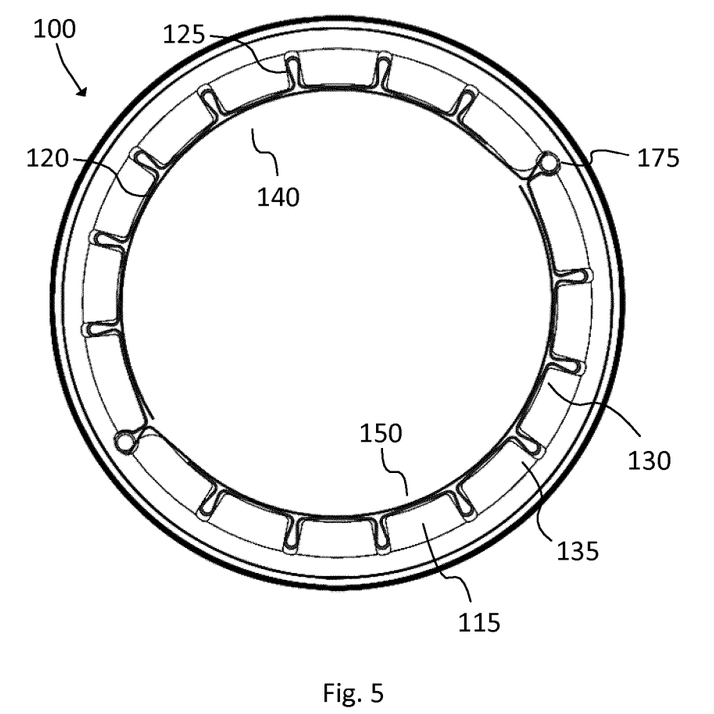
FIG. 5 depicts an example of a compliant foil radial bearing from a direction parallel to the axis of the bushing.

With reference to FIG. 2, one or more of the grooves 118 may be provided with radially outer retaining socket regions 175 for retaining one or more retaining members 170, 180. As shown in FIG. 5, the radially outer retaining regions 175 may take the form of a bulbous socket portion in the groove 118. According to one configuration, each of the grooves 118 may be provided with such retaining regions. This facilitates enhanced configurability as the retaining members 170, 180 may be inserted at different positions around the circumference of the bushing 110 according to different applications, use conditions, etc.

Figure 4:
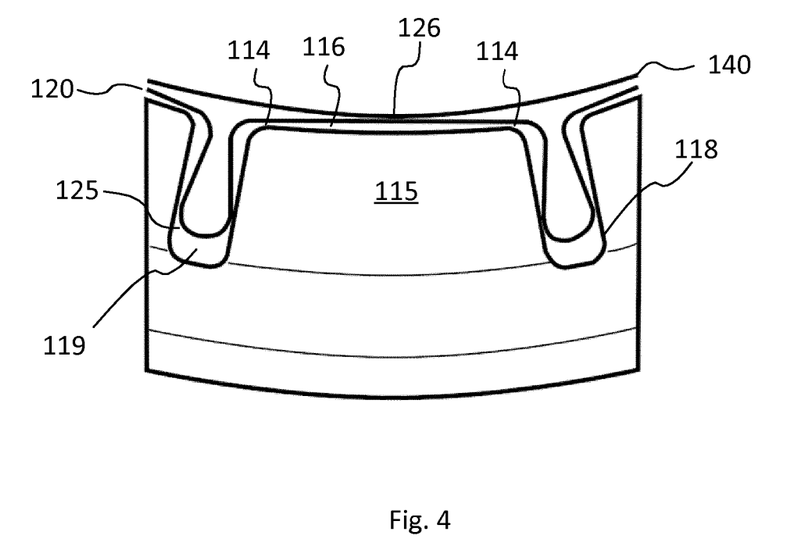
FIG. 4 depicts an example of the interaction between the pads, spring foil and fluid foil.

As depicted in FIG. 4, a clearance 119 may be provided between radially outer ends of the spring foil 120 and radially outer ends of the grooves 118.

FIG. 4 shows the grooves 118 comprising a uniform circumferential cross sectional width. This facilitates simplified manufacturing. However, the grooves 118 may comprise a non-uniform circumferential cross sectional width. The grooves 118 may comprise a circumferential cross sectional width that decreases in a radially inward direction. The latter facilitates retaining the loops 125 within the grooves 118.

The loops 125 may comprise a radially outer circumferential width that is greater than a radially inner circumferential width of the grooves 118. This facilitates securely retaining the spring foil 120 in the bushing 110.

The spring foil may thus be inserted within the bushing by sliding the loops 125 into the grooves 118, the loops 125 then being retained within the grooves 118.

Each pad 115 may be provided with a radially inner surface 116 arranged to support the spring foil 120 between circumferentially spaced axially oriented contact regions 114 formed by contact between the radially inner surface 116 and the spring foil 120. In this way the fluid foil 140 may be supported by axially oriented resilient strips disposed between the loops 125 of the spring foil 120.

The above-described form of contact between the spring foil 120 and the pads 115 facilitates establishing a pin-pin beam provided by the spring foil 120, the beam supported between two circumferentially spaced axially oriented contact regions 114, at each pad. In this way resilience is provided in the portions of the spring foil adjacent each pad, providing circumferentially spaced resilient strips supporting the fluid foil, e.g. at mid-points 126 of the circumferentially spaced resilient strips.

This arrangement serves to provide a mechanism for supporting the fluid foil 120 at circumferentially spaced axially oriented support regions 126 and such a support mechanism has been identified as offering improved radial bearing performance characteristics.

The stiffness of the spring foil 120 can be tuned by altering the circumferential profiles of each pad. For example, a wider pad can be employed to lengthen the pin-pin beam between circumferentially spaced contact regions 114. The pad circumferential width and/or the spacing between pads may be uniform or non-uniform.

The clearance 119 provided between a radially outer distal end of the loops 125 and a radially outer distal end of the grooves 118 synergistically facilitates improved pin-pin beam operation as described above. In particular, the lack of contact between the distal ends of the loops 125 and the distal ends of the grooves 118 prevents transfer of forces therebetween, which might interfere with the pin-pin beam operation.

Furthermore, play between the loops 125 and the groove ends aids in establishing independence between adjacent pin-pin beams. This effect may be increased by providing the loops 125 with a region comprising a circumferential width that increases in a radially outward direction.

Figure 6:
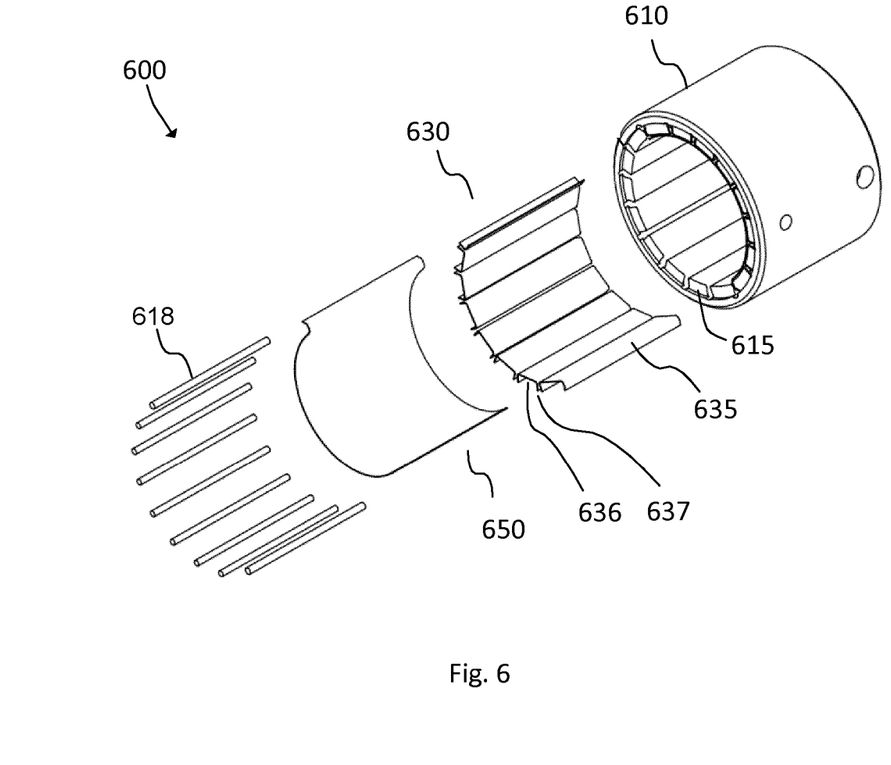
FIG. 6 depicts a further example of a compliant foil radial bearing in an exploded perspective view.

FIG. 6 depicts a further example of a compliant foil radial bearing 600. According to this example, the spring foil 630 comprises a plurality of axially oriented segments 635.

Each spring foil segment 635 may at least partially cover a pad.

Each spring foil segment 635 may be arranged to extend over a radially inwardly facing surface of each pad to resiliently support the fluid foil 650.

The spring foil segments 635 may fit over the pads thereby to provide resilient axially oriented strips to support the top foil. The strips may be supported at one or both ends thereof by the pads. Thus a strip may present a cantilever or may present a beam for supporting the top foil.

Each spring foil segment 635 may be arranged to cover a pad 615 in such a way as to provide a gap 638 between the spring foil segment and the pad. This gap 638 facilitates resilient radial deformation of the spring foil segment.

One or more axially oriented spring foil segments 635 may be arranged to fit around one or more of the axially oriented pads 615 of the bushing 610. The spring foil segments 635 may be substantially U-shaped, as shown in FIG. 6.

Each spring foil segment 635 may comprise a base portion 636 for contacting an inner radial surface of a pad and one or two leg portions 637 either side of the base portion for extending between adjacent pads. The base portion may be circumferentially aligned and/or the leg portions may be radially aligned with respect to the bore.

The spring foil segments 635 may be secured to the pads 615. For example, the spring foil segments 635 may be secured to the pads 615 by means of a friction fit or other retention means. Each pad 615 and each spring foil segment may comprise side surfaces that narrow in a radially outward direction. Such an arrangement may facilitate securing the spring foil segments 636 to the pads 615.

Figure 7:
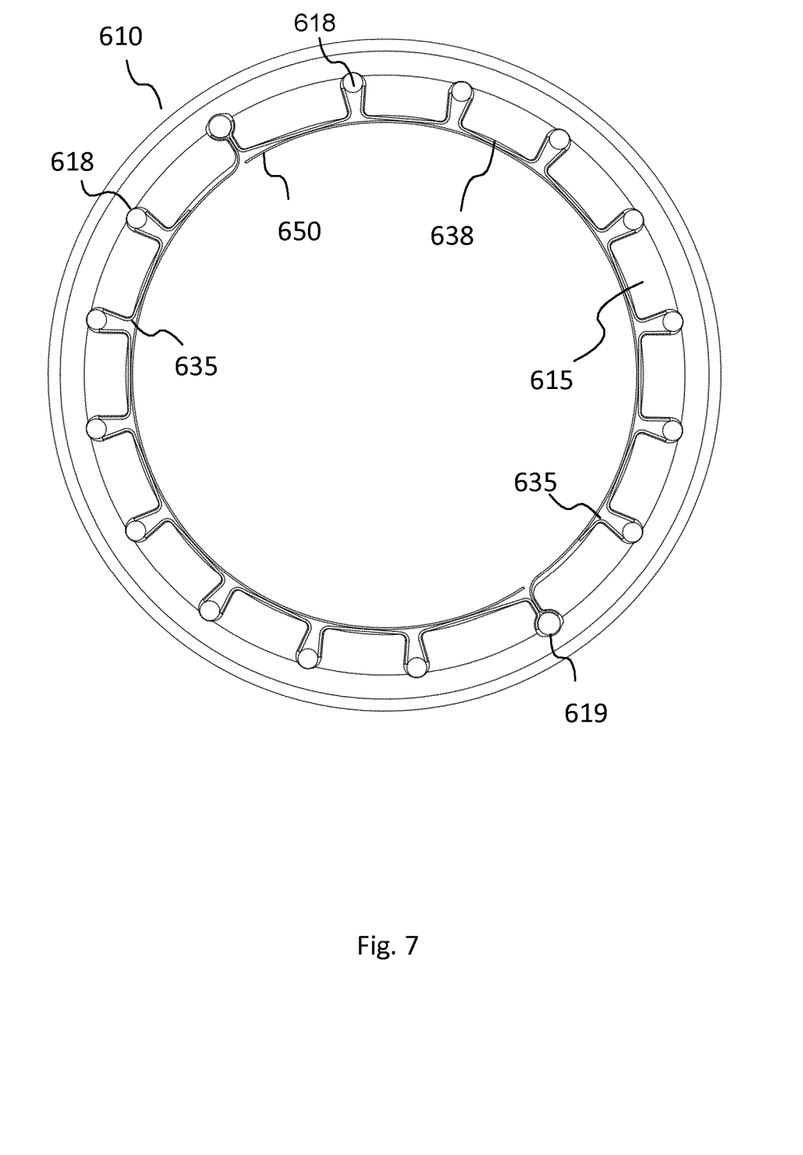
FIG. 7 depicts the example of FIG. 6 from a direction parallel to the axis of the bushing.

As shown in FIG. 7, a plurality of retention members in the form of spring foil segment retention pins 618 may be provided. The spring foil segment retention pins 618 may be arranged to fit in between adjacent pads thereby to secure the spring foil segments 635 to the pads 615. For example, the spring foil segment retention pins 618 may be arranged to fit within retention sockets, e.g. bulbous portions, of the grooves between pads. The spring foil retention pins 618 may wedge legs of the spring foil segments 635 against side surfaces of the pads. In this way, the spring foil may comprise a plurality of axially oriented resilient strips for contacting the fluid foil supported at one or both circumferential ends thereof by axially oriented radially extending legs that extend within, and are secured with respect to, grooves between the pads 615.

Providing a plurality of separate spring foil segments 635 that cover the pads facilitates improved independence between circumferentially adjacent portions of the spring foil covering adjacent pads thereby facilitating improved resilience characteristics.

In the example shown in FIGS. 6 and 7, the fluid foil 650 is provided in the form of two fluid foil segments and the spring foil 630 is provided in the form of a plurality of spring foil segments 635. In this way there may be provided a greater number of spring foil segments 635 than fluid foil segments 650.

The fluid foil 650 may be supported by a plurality of spring foil segments 635 evenly or unevenly distributed around the circumference of the bore.

Each spring foil segment 635 may be arranged to contact each axially oriented side surface of a pad to be covered by the spring foil segment 635.

The fluid foil 650 may be retained by a retention pin 619 arranged to fit between adjacent pads that wedges the fluid foil 650 against a first side surface of a fluid foil retention pad of the plurality of pads 615. A spring foil segment 635 arranged to cover the fluid foil retention pad may be arranged to contact only the second side surface of the fluid foil retention pad. Thus the fluid foil retention pad may be sandwiched in a circumferential direction between an axially oriented spring foil segment 635 contacting one side of the fluid foil retention pad and an axially oriented portion of the top foil contacting the other side of the fluid foil retention pad.

There may be provided substantially U-shaped spring foil segments 635 arranged to contact both side surfaces of the pads and/or substantially right-angled spring foil segments 635 arranged to contact one surface of the pad.

As shown in FIGS. 6 and 7, the fluid foil retention pads may be wider than the remaining pads.

As shown in FIGS. 6 and 7, one or more pads 615 adjacent the one or more retention pins 619 may be provided with increased widths as compared to the widths of the remaining pads.

Figure 8:
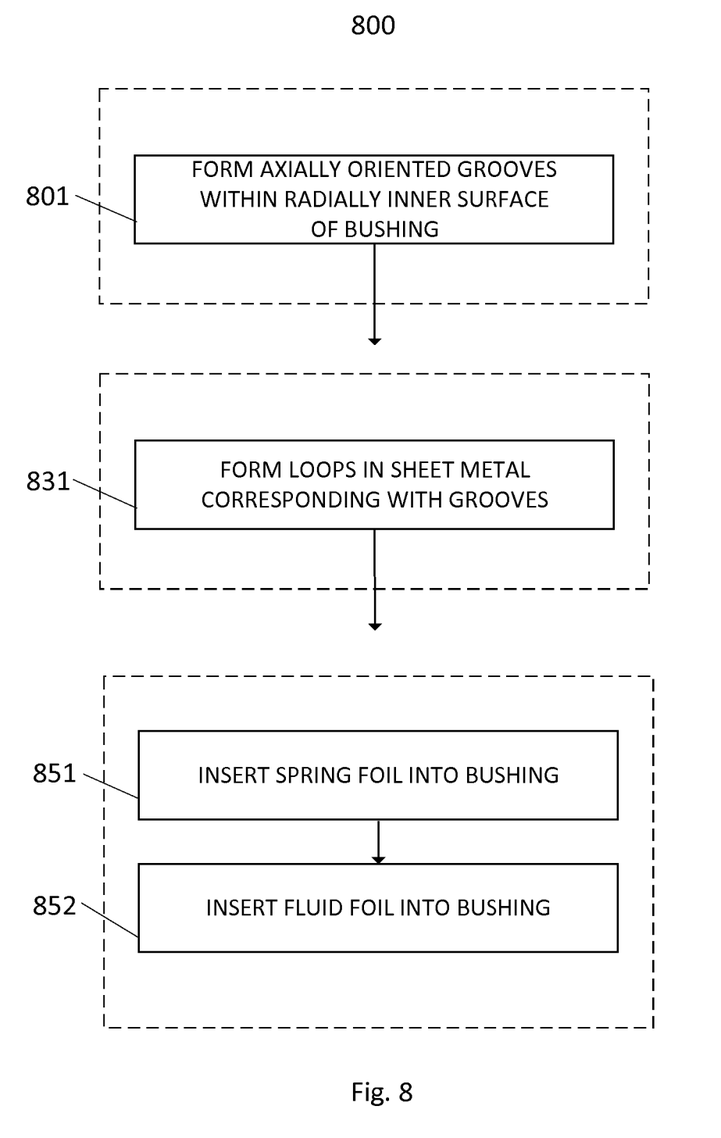
FIG. 8 depicts a method of manufacturing a compliant foil radial bearing.

A method 800 of manufacturing the compliant foil radial bearing shall now be described in connection with FIG. 8.

The method 800 may comprise one or more of: forming a bushing having axially oriented grooves running through the radially inner surface thereof 801; forming a spring foil from sheet metal having parallel disposed loops running therethrough 831; and inserting the spring foil 851 and optionally a fluid foil into the bushing 852.

Having provided a bushing 110, in step 801, axially oriented grooves 118 may be formed in a radially inner surface of the bushing 110. The grooves 118 may be formed in bushing 110 by employing Electrical Discharge Machining (EDMing), e.g. Wire Electrical Discharge Machining (WEDMing). This process offers simplified manufacturing with excellent consistency, and offers greater control over the shape of the grooves. The grooves may be provided with cross sectional profiles that define at least in part a rectangular, trapezoidal or circular cross section Although not shown, retaining regions 175 for retaining retention members 170, 180, which may be pins, may be formed in one or more, or each, of the grooves 118.

In step 831, sheet metal may be deformed thereby to provide parallel disposed ridge regions, which may define loops in cross section. The spring foil 120 may be formed by forming loops 125 having a separation therebetween corresponding with the circumferential spacing between grooves 118 formed in the bushing 110. The spacing between the grooves and the loops may be uniform or non-uniform. Whereas uniform spacing facilitates simplified manufacturing, non-uniform spacing facilitates improved accommodation for gravitational forces acting on the rotor in operation. For example, the spacing at a region of the spring foil and bushing underneath the rotor may be reduced to provide a greater contact density at the base of the rotor.

In steps 851 and 852, the spring foil 120 and fluid foil 140 may be inserted into the bushing. For step 851, loops 125 formed in the spring foil 120 may be slid into grooves 118, which may be formed with circumferential widths at a radially inner proximal end that is less than the circumferential widths of the loops 125.

Figure 9:
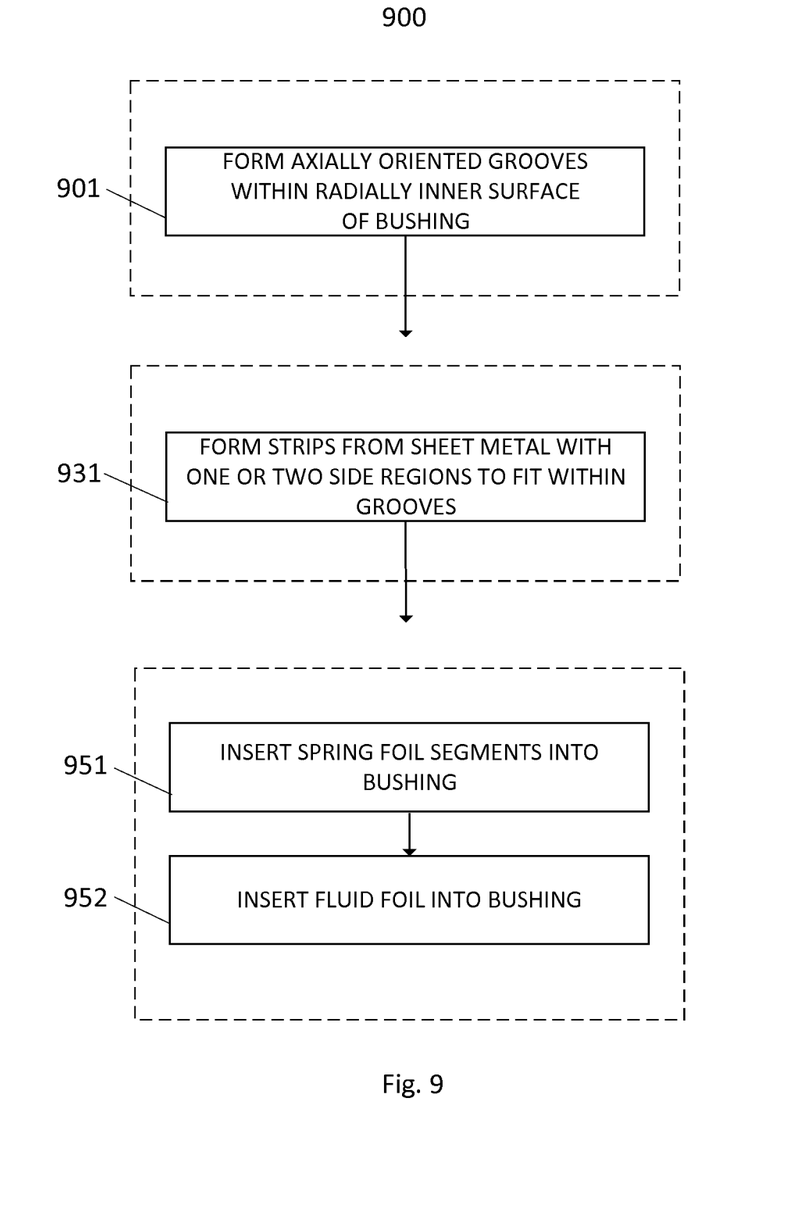
FIG. 9 depicts a further method of manufacturing a compliant foil radial bearing.

FIG. 9 depicts a further method 900 of manufacturing a compliant foil radial bearing.

The method 900 may comprise one or more of: forming a bushing having axially oriented grooves running through the radially inner surface thereof 901; forming strips from sheet metal with one or two side surfaces arranged to extend within the grooves 931, wherein each strip may comprise a region arranged to extend within the groove and a region arranged to extend over one or more pads formed between the grooves; inserting the spring foil segments into the bushing 951 and inserting the fluid foil into the bushing 952.

According to step 931, strips may be formed from sheet metal thereby to provide spring foil segments 635 arranged to at least partially cover the pads 615 of the bushing formed between grooves. The strips may comprise one or more bends for axial orientation. The bends may be aligned with axially oriented bends of the pads formed at radially inner portions of the grooves. The bends of the pads may be the regions of the pads traversing in cross section the grooves with a radially inner surface of the pads. The spring foil segments may cover one or both axially oriented bends of the pads.

Each of the examples disclosed herein, including the claimed examples, may be provided in a gas turbine system, e.g. a micro turbine system, comprising the fluid foil radial bearing according to any one example. Employing such a fluid foil radial bearing in a gas turbine system provides a gas turbine system offering improved management of frictional losses and heat It will be recognized that the examples disclosed herein are not limiting and are capable of numerous modifications and substitutions.

The invention claimed is:

1. A compliant foil radial bearing comprising:
a bushing comprising a bore defined therethrough;
a spring foil arranged to conform to a radially inner surface of the bore;
a fluid foil arranged to conform to a radially inner surface of the spring foil for rotatable receiving a rotor, wherein:
the radially inner surface of the bore comprises a plurality of axially oriented pads arranged around the circumference thereof,
wherein the pads are arranged such that variation in a circumferential direction exists between surface profiles defined by the pads.

2. The compliant foil radial bearing according to claim 1, wherein:
the spring foil comprises a plurality of axially oriented loops arranged to fit within axial grooves formed between adjacent pads.

3. The compliant foil radial bearing according to claim 2, wherein:
the loops and grooves are arranged such that a clearance is defined between a radially outer portion of the loops and a radially outer portion of the grooves.

4. The compliant foil radial bearing according to claim 2, wherein:
the circumferential width of each groove decreases in a radially inward direction.

5. The compliant foil radial bearing according to claim 1, wherein:
each pad comprises a radially inner surface arranged to support the spring foil between circumferentially spaced axially oriented contact regions formed by contact between the radially inner surface and the spring foil.

6. The compliant foil radial bearing according to claim 5, wherein:
the contact regions comprise a continuous line contact in the axial direction.

7. The compliant foil radial bearing according to claim 1, wherein:
the bushing and pads are unitary.

8. The compliant foil radial bearing according to claim 1, wherein the spring foil includes at least two circumferentially spaced spring foil members.

9. The compliant foil radial bearing according to claim 8, comprising: one or more axially oriented fluid foil retention pins, wherein:
each fluid foil retention pin is arranged to fit in between adjacent pads thereby to secure the fluid foil with respect to the bushing.

10. The compliant foil radial bearing according to claim 9, wherein:
the one or more fluid foil retention pins are arranged to fit within radially outer retaining regions of axially oriented grooves formed between adjacent pads.

11. The compliant foil radial bearing according to claim 1, wherein:
the spring foil comprises a plurality of axially oriented spring foil segments; and
each spring foil segment is arranged to fit around one of the axially oriented pads.

12. The compliant foil radial bearing according to claim 11, comprising:
a plurality of axially oriented spring foil retention pins, wherein: each spring foil retention pin is arranged to fit in between adjacent pads to secure the plurality of axially oriented spring foil segments with respect to the bushing.

13. A method of manufacturing a compliant foil radial bearing comprising:
providing a bushing comprising a bore defined therethrough;
forming a plurality of axially oriented grooves within the radially inner surface of the bushing to define a plurality of axially oriented pads arranged around the circumference of the bore;
providing a spring foil comprising axially oriented loops arranged to fit within the axial grooves;
inserting the spring foil into the bushing such that the radially inner surface of each axially oriented pad supports the spring foil between circumferentially spaced axially oriented contact regions,
wherein one or more of the axial grooves are provided with radially outer retaining socket regions for retaining one or more retaining members, and
wherein the spring foil comprises two circumferential end regions between end loops and circumferential extremities, with one circumferential end region comprising a circumferential length greater than the other to provide a retaining portion arranged to wrap around one of the retaining members.

14. A compliant foil radial bearing comprising:
a bushing comprising a bore defined therethrough;
a spring foil arranged to conform to a radially inner surface of the bore;
a fluid foil arranged to conform to a radially inner surface of the spring foil for rotatably receiving a rotor, wherein:
the radially inner surface of the bore comprises a plurality of axially oriented pads arranged around the circumference thereof, each pad comprising a radially inner surface arranged to support the spring foil, axial grooves being formed between adjacent pads; and wherein
the spring foil comprises axially oriented loops arranged to fit within the axial grooves; and
the radially inner surface of each pad supports the spring foil between circumferentially spaced axially oriented contact regions formed by contact between the radially inner surface and the spring foil, such that circumferentially spaced axially oriented resilient strips disposed between loops support the fluid foil; and wherein:

one or more of the axial grooves are provided with radially outer retaining socket regions for retaining one or more retaining members, wherein the spring foil comprises two circumferential end regions between end loops and circumferential extremities, with one circumferential end region comprising a circumferential length greater than the other to provide a retaining portion arranged to wrap around one of the retaining members.

15. The compliant foil radial bearing of claim 14, wherein the loops and grooves are arranged to define a clearance between a radially outer portion of the loops and a radially outer portion of the grooves.

16. The compliant foil radial bearing of claim 14, wherein a circumferential width of each groove decreases in a radially inward direction.

17. The compliant foil radial bearing of claim 14, wherein the contact regions comprise a continuous line contact in the axial direction.

18. The compliant foil radial bearing of claim 14, wherein the pads are arranged such that variation in a circumferential direction exists between surface profiles defined by the pads.

19. The compliant foil radial bearing of claim 14, wherein the bushing and pads are unitary.

20. The compliant foil radial bearing of claim 14, wherein the spring foil includes at least two circumferentially spaced spring foil members.

* * * * *